Patented June 22, 1937

2,084,833

UNITED STATES PATENT OFFICE 2,084,833

PROCESS FOR THE MANUFACTURE OF HIGHLY ACETYLATED CELLULOSE ACETATES

Ernst Berl, Darmstadt, Germany

No Drawing. Application September 12, 1932, Serial No. 632,791. In Germany July 3, 1931

16 Claims. (Cl. 260—101)

The present invention relates to improvements in the manufacture of cellulose acetates.

It is known to manufacture cellulose acetates by treating cellulose or substances containing cellulose firstly alone with glacial acetic acid containing sulphuric acid, and then with the addition of acetic anhydride or acetyl chloride. In carrying out this known process the method was to heat to 60–70° C. the cellulose or cellulose containing substance with a small quantity of sulphuric acid in the presence of glacial acetic acid, in order to hydrolyze it and to add to the hydrolyzed product after cooling several times the quantity of acetic anhydride. By this means, according to the temperature at which the acetylating process was carried out, for example according as it was carried out below 30° C. or at about 70° C. products having different properties were obtained.

It is also known to effect the treatment with acetic anhydride in the aforesaid acetylating process in the presence of a substance, namely carbon tetrachloride, which does not dissolve the acetylated cellulose, in which case the temperature was preferably maintained at about 30° C. during the acetylating process.

By carrying out this process there are obtained acetylated products, the properties of which leave something to be desired in various directions.

According to the present invention, highly acetylated products having particularly valuable properties are obtained in the following way: cellulose or cellulose containing substances are hydrolyzed in a manner known in itself with glacial acetic acid which contains small amounts of a catalyst, for example, sulphuric acid, derivatives of perchloric acid and the like, not as hitherto usual at temperatures of 60–70° C., but at considerably lower temperatures which do not exceed or do not considerably exceed 30° C., for example, temperatures between 5° and 25° C., after which the acetylation by means of acetic anhydride can be effected in any desired manner with the addition of a substance or a mixture of substances which does not dissolve cellulose acetate.

As additional substances for this purpose may be mentioned, for example, carbon tetrachloride, benzene, ether, petroleum ether, toluene, and also substances which are suitable for softening or swelling cellulose acetate at the temperatures in question to a limited or to a great extent, or mixtures of substances of the kind stated. Preferably benzene is used as the added swelling substance, which, as is well known, has an extremely strong swelling action on cellulose acetate when heated, particularly in the presence of alcohol, while its capability for producing a softening or swelling effect is reduced at lower temperatures to a fraction of that at a higher temperature. Instead of or in addition to benzene, other substances having a similar action can be employed, that is to say, substances whose swelling action on cellulose acetate is limited at the temperatures in question. The amount of these additional substances is preferably such that the triacetate formed remains almost completely insoluble in the acetylating mixture.

It has been found very advantageous to carry out the acetylating process in such a manner that the hydrolyzed product, after the addition of the acetic anhydride, is kept for some time, for example some hours, at very low temperatures, for example 0° C. or temperatures not considerably exceeding 0° C., and only then to heat it, for example, in such a manner that the temperature is gradually increased to 25–30° C. The heating to temperatures which lie considerably above 30° C. is thereby preferably avoided.

It has also proved advantageous to proceed in the first stage of the process in such a manner that the acetic acid-cellulose mixture contains small amounts of water, for example 2–3%. In this case highly dried cellulose can be introduced into somewhat diluted acetic acid or cellulose containing a normal percentage of moisture may be added to acetic acid which is correspondingly lacking in water. The glacial acetic acid is preferably employed in considerable excess over the cellulose or the cellulose containing material, with the stipulation that, after the treatment, the excess of glacial acetic acid is again removed before carrying out the acetylating process, for example, by centrifuging or washing, for example, with the liquid which will not dissolve cellulose acetate and which is added for the acetylation. In the preparation of linter, for example ten to twelve times the amount of acetic acid may be employed and the liquid may be separated after the hydrolysis is completed up to about the weight of cellulose employed.

The acetylation is preferably carried out so that the treating liquid is passed, for example, pumped through the fibrous hydrolyzed cellulose from below to above or the reverse. The acetylating mixture once used is preferably removed for being worked up or separated for example by distillation without being again used for the treatment, for example, until the acetic anhydride is used up. At the end of the acetylation, the liquid mixture in the acetylation vessel can be drawn off, for example, from above to below, for example by means of benzene or the added liquid already used for the acetylation and the added liquid itself be removed by washing with water. The remainder of the added fluid is washed out, for example, with hot water or steam.

Example 1

Dried cellulose is treated with several times the quantity of about 97½% glacial acetic acid which contains 0.3% sulphuric acid as catalyst. After remaining for several hours at about 20° C., during which the reaction mass may if necessary be kept in motion, the excess of the acid mixture is separated by centrifuging or pressure, for example, in such a manner that approximately the same quantity of acid mixture, calculated on the weight of the cellulose, remains in the intermediate product. It can also be contrived that the acetic acid is completely drained off with the swelling liquid, for example, benzene, which is to be used subsequently. The acid-saturated intermediate product is now introduced into a cool mixture containing an excess of acetic anhydride of, for example, 3–6 times and preferably about five times the weight of the cellulose and so much benzene (about 5–10 times and preferably eight times the weight of cellulose) that the tri-acetate formed remains almost completely insoluble in the acetylating mixture. When carrying out the acetylating process the temperature is kept low, for example, at about 0° C., for several hours by cooling; after this the temperature is allowed slowly to rise; towards the end of the reaction the temperature is moderately raised, for example, to 25–30° C. It is preferable to proceed so that the liquid is moved through the stationary mass. When a test portion exhibits complete solubility in alcoholic methyl formate or in dichloro-methane, the liquid mixture is separated from the cellulose tri-acetate formed, and is freed from adhering acetic anhydride and acetic acid by washing several times with benzene. The greater part of the benzene can be removed by draining off with water. The benzene which remains, however, is driven off by heating or, for example, with the aid of steam evaporated at normal or reduced pressure. The fibrous cellulose tri-acetate formed becomes, in contradistinction to tri-acetates formed by known methods, after a short stabilizing process completely stable when stored. It contains scarcely any combined sulphuric acid. The waste liquids can be partly or entirely separated by distillation and again returned to the process. The economy in consumption of acetic anhydride and acetic acid when the manufacture is carried out in this way is extremely great. In practical working an amount of anhydride which only slightly exceeds the theoretical amount is sufficient. As compared with previous manufacturing processes which have almost exclusively been carried out in small batches the present process can be carried out smoothly with large charges.

Example 2

Dried cellulose is treated with 5–12 times the amount of approximately 97½% glacial acetic acid containing 0.3% sulphuric acid. The mixture is kept for several hours at a temperature of about 25° C. during which the charge can be kept in motion, if necessary, for example, by stirring.

After completion of the hydrolysis the excess of acetic acid is removed by centrifuging, for example, in such a manner that the material which remains behind contains only about one part glacial acetic acid to one part cellulose. The greater part of the acetic acid and the catalyst employed can be removed by washing with carbon tetra-chloride. The cellulose material thus obtained which is uniformly saturated by acid is now introduced into a mixture of excess acetic anhydride and carbon tetrachloride or the like during which the temperature is kept low by cooling for some hours, preferably at about 0° C. After this the temperature is allowed slowly to rise; towards the end of the reaction it is raised to about 25–30°. The amount of the additional substance, for example carbon tetrachloride, is preferably such that the tri-acetate formed remains almost entirely insoluble in the acetylating mixture. For this purpose about 5 to 10 times and preferably 8 times the weight of the cellulose is necessary. After completion of the acetylating process the liquid mixture is separated from the cellulose acetate which exhibits a fibrous structure and the still adhering acetic anhydride and acetic acid is removed by washing several times with carbon tetrachloride. The fibrous cellulose tri-acetate is freed from carbon tetrachloride by the usual methods, and after a short stabilizing process becomes completely stable and able to be stored.

The present process affords advantages in several directions. On the one hand, owing to the hydrolysis at low temperatures, an undesired splitting up of the cellulose molecule is avoided, and on the other hand, by the further treatment of the hydrolyzed product thus obtained, extremely homogeneous uniformly acetylated final products are obtained, particularly when the acetylating process is carried out at very low temperatures, preferably at about 0° C., and the temperature is only raised towards the end of the process, in which case also temperatures which exceed or substantially exceed 30° C. are preferably avoided.

By employing glacial acetic acid in multifold, for example four-fold, excess, the process of hydrolyzing proceeds uniformly and favourably. By separating the excess of acetic acid before the acetylating process, the advantage is obtained that the latter process also proceeds also very uniformly and high yields of acetate are obtained. A further advantage is that, in consequence of the reduction in the quantity of acetic acid which otherwise has a solvent action on the tri-acetate formed, considerably smaller quantities of additional materials such as benzene or carbon tetrachloride are necessary.

If the acetic acid and a part of the adsorbed catalyst for instance sulphuric acid are thoroughly drained off before the acetylation process, it becomes particularly easy to obtain very stable cellulose acetate without using stabilizing agents, which for example, at 196° C. after 45 minutes have a slight yellow colour.

By washing the acetylating mixture, remaining in the reaction chamber on completion of the acetylation with the added liquid, it is possible to work up the acetylizing mixture containing acetic anhydride, for example, by distillation, without its coming into contact with water which saponifies the acetic anhydride. Relatively large amounts of excess of acetic anhydride which in turn bring about a particularly rapid acetylation, can be used without having to reckon with any loss of acetic anhydride.

By means of the processes described, there are obtained products which are very different from the cellulose acetates usual in commerce. By means of the processes of the invention, products can be manufactured which, after their analytically ascertained content of acetic acid, represent a true tri-acetate, whereas the products obtained by the known methods of manufacture generally have a content of acetic acid which lies below 60%. The products are distinguished by great insensitiveness and invariability when stored. This applies both in the case of pure acetate, as well as for products manufactured therefrom, such as for example films, foils, artificial silk and the like.

By means of the processes described, products can be obtained which, even after a storage lasting for years in a closed container in a warm place, give off no trace of acetic acid. Whereas, almost all known highly acetylated products are insoluble in chloroform and only go into solution on the addition of alcohol, the present invention enables products to be manufactured which are quite soluble in chloroform and also in pure dichloromethane. Products can also be obtained which, like the secondary acetates, are soluble at the ordinary temperature in a mixture of about 95-75% of dichloromethane with 5-25% of ethyl alcohol in amounts of, for example 25% and over and which can easily be worked up in this form, whereas known tri-acetates are generally again thrown out from dichloro-methane already when added in an amount of about 10%.

The highly acetylated cellulose acetates obtained in accordance with the invention are further distinguished by the feature that they are practically insoluble in acetone and can take up considerable quantities of sterilizing agents, such as for example benzoic ester, as well as large amounts of softening media without there being any danger of these substances again exuding or crystallizing out from the finished product.

The invention enables products to be manufactured which can be well worked up with the usual plastifying agents, such as for example tri-acetin, phthalic methyl ester, ethyl-toluene sulphamide, glycollic-acetate, tri-cresyl phosphate as well as oils for example castor oil, waxes and the like, whereas known tri-acetates give useless masses with most plastifying agent and can generally be worked up only with phenols or amines, which, however, owing to their physical properties cannot be taken into consideration. Whereas, the cellulose tri-acetates produced according to the former processes split up after a short time into phenol acetic acid, the acetates manufactured in accordance with the invention do not do this even after standing for months.

Further noteworthy properties of the products manufactured in accordance with the invention are their extreme insensitiveness and complete imperviousness to water. Even after being soaked with water for several days these products do not swell up, also no increase in weight can be determined. Dehydrated calcium chloride packed in a sheet of these products even after being stored for a long time in damp air showed only a slight increase of weight, which proves the impenetrability of the packing material to water.

The products manufactured in accordance with the invention can be worked up to materials of the most varied kind, such as films, foils, threads, pressed materials and the like which themselves, owing to their special properties, can be made use of with advantage in a large number of different ways. The products are excellently suited, for example, for electrical insulation, they exhibit about the same disruptive strength as mica. Their di-electric constant is 4.5. Owing to their insensitiveness and their impenetrability to water, as well as to fats and oils, they are particularly suitable as packing materials in particular for food and similar substances. By means of packing materials of this kind, products such as bread and fresh fruits for example which give off water and, therefore spoil, can on the one hand be kept fresh, while on the other hand products which deteriorate or spoil by taking up water can be protected against this. Also oily foods such as, for example, sardines as well as butter, margarine, dripping can be reliably packed. In this case there is the further advantage that the packed goods can be sterilized in the packing as the packing material well withstands sterilizing temperatures, for example 115-150° C., and only colours up at considerably higher temperatures, for example temperatures above 200° C.

Extraordinarily thin foils or films can be manufactured, for example of a thickness of only 0.007 to 0.008 mm., whereas cellulose foils are generally about 0.025 mm. in thickness. These thin films or foils also possess good mechanical strength and are absolutely waterproof. The films or foils manufactured in accordance with the invention are also extremely strong in a damp condition. Cellulose foils when damp exhibit a loss of strength of about 75-85%, the products obtained by the present invention on the other hand lose only, for example about 5-15% of their strength. These products can also be applied to supports or foundations of any kind by a spraying process or a dipping process or by like means.

The highly acetylated products obtained by the processes of the invention may also be worked up together with other cellulose derivatives and combination effects can thereby be obtained, for example, by dissolving tri-acetate manufactured in accordance with the invention together with cellulose nitrate in methyl formate and denitrating. Material of this nature can be used, for example for sausage skins, and for other purposes in which the material must be on the one hand resistant to water, and on the other hand to some extent pervious to water. Combinations of this kind can also be worked up with advantage, in the undenitrated condition, to varnishes, textiles and the like, since the danger from fire is almost completely eliminated. Further important uses of the highly acetylated products manufactured in accordance with the invention and the further products obtained therefrom, are for example, in the manufacture of artificial silk and the like.

I claim:—

1. The process of manufacturing highly acetylated cellulose acetates soluble in chloroform and insoluble in acetone which comprises treating dry cellulose with glacial acetic acid present to an extent of about 5 to 12 times the weight of said cellulose and containing about 0.3% of a catalyst, continuing said treatment for several hours at a temperature of about 25° C. while keeping the mass in motion to produce a hydrolyzed product, removing excess of acetic acid from the hydrolyzed product, subjecting the hydrolyzed product to the action of a mixture of excess acetic anhydride and a substance capable of exerting a swelling action on the cellulose acetate but incapable of exerting a solvent action thereon, and maintaining said mixture for several hours at about 0° C. whereby a fibrous highly acetylated cellulose acetate is produced which is soluble in pure chloroform and insoluble in acetone.

2. The process of manufacturing highly acetylated cellulose acetates soluble in pure chloroform and insoluble in acetone which comprises treating dried cellulose with several times the quantity of about 97½% glacial acetic acid containing about 0.3% sulfuric acid, maintaining a temperature of about 20° C. for about several hours while keeping the reaction mass in motion to produce a hydrolyzed product, separating the excess of acid from the hydrolyzed product, subjecting the hydrolyzed product to the action from about 3 to 6 times the quantity of acetic anhydride containing about 5 to 10 times the quantity of benzene, maintaining a temperature of about 0° C. for several hours, permitting the temperature to rise slowly towards the end of the reaction to about 25° to about 30° C., continuing the treatment with acetic anhydride until a test portion exhibits complete solubility in alcoholic methyl formate to produce a highly acetylated product, and freeing the highly acetylated cellulose from liquid containing acetic anhydride, acid, and the like, whereby a fibrous highly acetylated cellulose acetate is produced which is soluble in pure chloroform and insoluble in acetone.

3. The process of manufacturing highly acetylated cellulose acetates soluble in pure chloroform and insoluble in acetone which comprises treating dried cellulose with several times the quantity of about 97½% glacial acetic acid containing about 0.3% sulfuric acid, maintaining a temperature of about 20° C. for about several hours while keeping the reaction mass in motion to produce a hydrolyzed product, separating the excess of acid from the hydrolyzed product, subjecting the hydrolyzed product to the action from about 3 to 6 times the quantity of acetic anhydride containing about 5 to 10 times the quantity of carbon tetrachloride whereby a fibrous highly acetylated acetate is produced which is soluble in pure chloroform and insoluble in acetone.

4. The process of manufacturing fibrous cellulose tri-acetate soluble in pure chloroform and insoluble in acetone which comprises treating dry cellulose with glacial acetic acid present to an extent of several times the weight of said cellulose and containing a small amount of a catalyst, continuing said treatment for several hours at a relatively low temperature while keeping the mass in motion to produce a hydrolyzed product, removing excess of acetic acid from the hydrolyzed product, subjecting the hydrolyzed product containing a small amount of acetic acid to the action of a mixture of excess acetic anhydride and a substance capable of exerting a swelling action on the cellulose acetate but incapable of exerting a solvent action thereon, and maintaining said mixture for several hours at a relatively low temperature whereby fibrous cellulose tri-acetate is produced which is soluble in pure chloroform and insoluble in acetone.

5. The process of manufacturing fibrous cellulose tri-acetate soluble in pure chloroform and insoluble in acetone which comprises hydrolyzing cellulose with glacial acetic acid in the presence of a small amount of a catalyst at a relatively low temperature to produce a hydrolyzed product, removing excess of acetic acid from said hydrolyzed product, and acetylating the acid saturated hydrolyzed product in the presence of an excess of acetic anhydride and a non-solvent swelling agent whereby a highly acetylated acetate which is soluble in pure chlorofrom and insoluble in acetone is produced.

6. The process of manufacturing fibrous cellulose tri-acetate soluble in pure chloroform and insoluble in acetone which comprises hydrolyzing cellulose with glacial acetic acid containing a small amount of catalyst at a temperature not exceeding about 30° C. to produce a hydrolyzed product, removing the excess of acetic acid, and acetylating the hydrolyzed product containing a small amount of acetic acid with an excess of acetic anhydride containing a substance capable of exerting a swelling action on the cellulose acetate product but incapable of exerting a solvent action thereon whereby a fibrous cellulose tri-acetate which is soluble in pure chloroform and insoluble in acetone is produced.

7. The process of manufacturing fibrous cellulose tri-acetate soluble in pure chloroform and insoluble in acetone which comprises hydrolyzing cellulose with glacial acetic acid containing a small amount of catalyst at a temperature not exceeding 30° C. to produce a hydrolyzed product, removing glacial acetic acid containing the catalyst from said hydrolyzed product, and acetylating at a relatively low temperature the hydrolyzed product containing a small amount of acetic acid with an excess of acetic anhydride containing a substance capable of exerting a swelling action on the cellulose acetate product but incapable of exerting a solvent action thereon whereby a fibrous cellulose tri-acetate which is soluble in pure chloroform and insoluble in acetone is produced.

8. The process of manufacturing fibrous cellulose tri-acetate soluble in pure chloroform and insoluble in acetone which comprises hydrolyzing cellulose with glacial acetic acid containing a small amount of catalyst and a small amount of water at a low temperature not exceeding 30° C. to produce a hydrolyzed product, removing the excess of acetic acid, and acetylating at a low temperature the hydrolyzed product containing a small amount of acetic acid in the presence of an excess of acetic anhydride containing a substance capable of exerting a swelling action on the cellulose acetate product but incapable of exerting a solvent action thereon whereby the greater portion of cellulose acetate remains insoluble in the acetylating mixture, and whereby a fibrous cellulose tri-acetate which is soluble in pure chloroform and insoluble in acetone is produced.

9. The process of manufacturing a fibrous cellulose tri-acetate soluble in pure chloroform and insoluble in acetone which comprises treating dry cellulose with glacial acetic acid present to an extent of several times the weight of said cellulose and containing a small amount of sulfuric acid as a catalyst, continuing said treatment for several hours at a low temperature while keeping the mass in motion to produce a hydrolyzed product, removing acetic acid from said product, subjecting the hydrolyzed product containing a small amount of acetic acid to the action of a mixture of an excess of acetic anhydride and a substance capable of exerting a swelling action on the cellulose acetate but incapable of exerting a solvent action thereon, said mixture being present to an extent of several times the weight of cellulose, maintaining said mixture for several hours at a low temperature, permitting the temperature to rise slowly towards the end of the reaction to about 25 to about 30° C. whereby a fibrous cellulose tri-acetate is produced which is soluble in pure chloroform, and insoluble in acetone.

10. As an article of manufacture, cellulose tri-acetate constituted of a fibrous structure and soluble in pure chloroform, and in pure dichloromethane, and insoluble in acetone and aniline.

11. As an article of manufacture, cellulose tri-acetate constituted of a fibrous structure and soluble to at least 25% at ordinary temperatures in a mixture of about 75 to 95% of dichloromethane and about 5 to 25% of ethyl alcohol, soluble in pure chloroform and insoluble in acetone and aniline.

12. As an article of manufacture, cellulose tri-acetate constituted of a fibrous structure and practically insensitive to water, oils and fats, stable when stored, and soluble in pure chloroform and insoluble in acetone and aniline.

13. As an article of manufacture, cellulose tri-acetate, constituted of a fibrous structure and soluble in pure chloroform and insoluble in acetone and aniline and evolving practically no trace of acetic acid even after storage for a long period of time.

14. As an article of manufacture, cellulose tri-acetate constituted of a fibrous structure, and having a dielectric constant of about 4.5, and being soluble in pure chloroform and insoluble in acetone and aniline.

15. As an article of manufacture, cellulose tri-acetate constituted of a fibrous structure and capable of taking up sterilizing agents of the benzoic acid type, and of taking up softening media and plastifying agents, soluble in pure chloroform and insoluble in acetone and aniline.

16. As an article of manufacture, foil, film and the like comprising cellulose tri-acetate constituted of a fibrous structure and having good mechanical strength, being waterproof and capable of being formed into foils, films, sheets and the like, having a thinness as low as about 0.007 to about 0.009 mm., and being soluble in pure chloroform and insoluble in acetone and aniline.

ERNST BERL.